United States Patent [19]
Finelli

[11] 3,880,809
[45] Apr. 29, 1975

[54] CONTAINER RESISTANT TO HYDROCARBON MATERIALS

[75] Inventor: Anthony F. Finelli, Akron, Ohio

[73] Assignee: The Goodyear Tire & Rubber Company, Akron, Ohio

[22] Filed: Jan. 14, 1974

[21] Appl. No.: 433,183

Related U.S. Application Data

[63] Continuation of Ser. No. 378,115, July 10, 1973, abandoned, which is a continuation of Ser. No. 173,227, Aug. 19, 1971, abandoned, which is a continuation-in-part of Ser. No. 682,517, Nov. 13, 1967, abandoned, which is a continuation-in-part of Ser. No. 324,884, Nov. 19, 1963, abandoned.

[52] U.S. Cl.......... 260/75 NH; 260/13; 260/31.2 N; 260/32.8 N; 260/33.6 UB; 260/33.8 UB; 260/37 N; 260/75 NK; 260/77.5 AM
[51] Int. Cl............................................. C08g 22/10
[58] Field of Search .... 260/37 N, 77.5 AM, 75 NH, 260/75 NK

[56] References Cited
UNITED STATES PATENTS
3,004,939   10/1961   Varvaro............................... 260/75

FOREIGN PATENTS OR APPLICATIONS
456,911   5/1949   Canada........................... 260/75 NA
822,532   10/1959   United Kingdom............ 260/75 NA Primary Examiner—Melvyn I. Marquis
Attorney, Agent, or Firm—F. W. Brunner; J. D. Wolfe

[57] ABSTRACT

A container having resistance to hydrocarbon materials formed of a polyurethane having an elongation in excess of 200 percent at −65°F., the polyurethane being the reaction product of an organic polyisocyanate and a mixture of polytetramethylene azelate and polytetramethylene adipate and a diamine.

1 Claim, No Drawings

CONTAINER RESISTANT TO HYDROCARBON MATERIALS

This application is a continuation of application Ser. No. 378,115, filed July 10, 1973, now abandoned, which was a continuation of application Ser. No. 172,227, filed Aug. 19, 1971, now abandoned which was a continuation-in-part of application Ser. No. 682,517, filed Nov. 13, 1967, now abandoned, which was a continuation-in-part application of Ser. No. 324,884, filed Nov. 19, 1963, now abandoned.

This invention relates to a container for holding and transporting fuel, where the container is subjected to relatively high impact at low temperature.

More particularly, this invention relates to polyesterurethane fuel containers which have exceedingly good elongation properties at low temperatures; illustratively, in excess of 200% at −65°F. In addition, the fuel containers of this invention exhibit adequate resistance to attack by solvents; i.e., it is not uncommon to have a solvent volume change of less than about 30% on standing at 75°F. for 96 hours in a mixture of 70% by weight of isooctane and 30% by weight of toluene.

Although such patents as U.S. Pat. Nos. 3,492,393 and 3,453,164 disclose how to make fuel containers of the polyesterurethane type and containers of this type have achieved considerable commercial success, it was early appreciated that the commercial containers made from these prior art compositions were lacking in low temperature properties, that is, the containers could not withstand impact very well at extreme low temperatures. Consequently, many attempts have been made to improve the low temperature properties of these polyesterurethanes. One of the more successful efforts in this endeavor is illustrated by U.S. Pat. No. 3,401,137, which discloses a mixture of tetramethylene adipate and alkylene adipate where the alkylene radical contains 2 or 3 carbon atoms used to prepare the polyesterurethane.

The polyesterurethanes of U.S. Pat. No. 3,401,137 have one significant disadvantage, viz., the elongation of the material at −65°F. is less than 200% and thus it has been found to be unacceptable for use in preparation of fuel cells to be used on certain classes of airplanes. Therefore, the fuel cells for this class of airplane have been built with conventional diene rubbers, using conventional techniques, with resulting higher costs and greater weight. It should be appreciated that any unnecessary added weight is a serious disadvantage. As is generally known in the industry, for each pound of fuel cell weight that can be eliminated, the savings in fuel during the life of the cell in the airplane is approximately equal to the original cost of the fuel cell.

The polyesterurethanes prepared and used commercially are predominantly linear molecules containing adipate groups. Although these polyurethanes have excellent abrasion resistance, oil resistance, tensile strength and even may be made essentially free of any tendency to become brittle at temperatures of as low as −60°F., these polyurethanes do not have an elongation at −65°F. in excess of 200%. Most of these have elongations of about 100% or less, consequently when these polyesterurethanes have been used to fabricate fuel cells for operation at relatively low temperatures, the fuel cells have failed to withstand the normal impact forces experienced by fuel containers while being transported full of gasoline or other hydrocarbon materials.

Therefore, it is an object of this invention to provide a method of preparing polyesterurethane fuel cell containers which have an elongation at −65°F. of at least 200%.

The fuel cell containers of this invention are prepared from polyurethane compositions obtained by reacting about 1.25 to 2.5 mols of an organic isocyanate containing essentially two isocyanate groups with about one mol of hydroxyl terminated polyester, said polyester comprising at least about 20, and preferably 28, weight percent of a polytetramethylene azelate having a molecular weight of about 800 to 3000 and preferably about 1000 to 2500 with about 0 to 80 weight percent of polytetramethylene adipate having a molecular weight of about 800 to 3000 and then reacting the excess isocyanate with about 0.5 to 0.9 mols of an aromatic diamine for each mol of polyisocyanate in excess of that equivalent to the hydroxyl terminated polyester. The preferred ratio of organic polyisocyanate to polyester is about 1.8 to 2.2.

Any suitable organic polyisocyanate may be utilized in the process of this invention, such as the following aliphatic diisocyanates: ethylene diisocyanate, propylene diisocyanate, tetramethylene diisocyanate, pentamethylene diisocyanate, octamethylene diisocyanate, undecamethylene diisocyanate, dodecamethylene diisocyanate and 3,3'-diisocyanato dipropylether, cyclopentylene-1,3-diisocyanate, cyclohexylene-1,4-diisocyanate, and the aromatic diisocyanates; 2,4-tolylene diisocyanate, 2,6-tolylene diisocyanate, xylylene-1,4-diisocyanate, xylylene-1,3-diisocyanate, 4,4'-diphenylmethane diisocyanate, 2-nitrodiphenyl-4,4'-diisocyanate, 4,4'-diphenyl propane diisocyanate, p-isocyanato benzyl isocyanate, m-phenylene diisocyanate, p-phenylene diisocyanate, naphthylene-1,4-diisocyanate, and 3,3'-dimethyl-4,4'-diphenylenediisocyanate. The aromatic diisocyanates are, however, preferred.

The aromatic diamines useful in this invention are used in the amount of about 0.25 to 0.9 mols per mol of excess organic polyisocyanate over that equivalent to the polyester. Preferred results are obtained when the amount of diamine is about 0.5 to 0.8 mols based on the excess organic polyisocyanate. Representative examples of suitable aromatic diamines where conventional techniques are to be used are the so-called slow diamines as measured by the boiling methylene chloride test such as methylene bis-ortho chloroaniline, ortho dichlorobenzidine, 4,4'-bis-aminophenyl sulfone. Representative examples of suitable fast diamines as measured by the boiling methylene chloride test are 4,4'-methylene dianiline, methyl tolidine, tolylene diamine, durene diamine, o-tolidine, o-dianisidine. Preferably, the fast diamines are dissolved in a suitable solvent before use.

Where 4,4'-diphenyl methane diisocyanate is used to react with the mixture of hydroxyl terminated polyesters, it is preferred in some cases to use a monomeric polyol instead of the diamine. Representative examples of these polyols are glycerol, trimethylol propane, propylene glycol, butane-diol and ethylene glycol.

The following examples illustrate the invention without, however, limiting it:

EXAMPLE I

Polytetramethylene azelate (300 parts) having a reactive number of 58.7 was degassed under vacuum at 75°C. for 15 minutes, 55 parts of a commercial mixture of toluene diisocyanates containing 80% of the 2,4-isomer and 20% of 2,6-isomer. The reaction mixture was stirred at atmospheric pressure for 50 minutes at 75°–80°C. to form the prepolymer. Then it was placed under vacuum for 30 minutes at 74°–80°C. A mix of 31.8 parts of 4,4-methylene bis-(2-chloroaniline) and 15 parts of the polytetramethylene azelate was added to the prepolymer with good stirring. The clear fluid melt was poured into tensile molds (12 × 12 × 0.05 inches) and then heated for 20 hours at 85°C. On cooling, the elastomer had the following physical properties:

| | |
|---|---|
| Shore A hardness | 79 |
| Tensile psi at 75°F. | 5400 |
| Elongation % at 75°F. | 600 |
| Tensile psi at −65°F. | 7800 |
| Elongation % at −65°F. | 350 |
| Masland Bend Test | OK at −90°F. |
| Volume change % | 31.7 |

Although this polyurethane elastomer had over 200% elongation at −65°F. its percent volume change indicates this polyurethane elastomer could not be used with highly aromatic fuels. Hence, this polyurethane elastomer would be used to construct containers which were not to be used to hold liquids having solubility properties similar to those of the aromatic solvents.

EXAMPLE II

A casting was prepared as in Example I from 400 parts of polytetramethylene azelate having a reactive number of 76.6, 96.5 parts of the 80%/20% mixture of 2,4 and 2,6-tolylene diisocyanate and 59 parts of 4,4'-methylene bis (2-chloroaniline). The cured elastomer had the following physical properties:

| | |
|---|---|
| Shore A hardness | 84 |
| Tensile psi at 75°F. | 3800 |
| Elongation % at 75°F. | 490 |
| Tensile psi at −65°F. | 7100 |
| Elongation % at −65°F. | 230 |
| Masland Bend Test | OK at −90°F. |
| Volume Change % | 25 |

EXAMPLE III

A casting was prepared from 150 parts of a polytetramethylene azelate having a reactive number of 58.7, 150 parts of tetramethylene adipate having a reactive number of 55.8, 54 parts of an 80%/20% mixture of 2,4- and 2,6-tolylene diisocyanate and 31 parts of 4,4'-methylene-bis-(2-chloroaniline). Fifteen parts of the azelate ester was used with the diamine. The cast and cured elastomer had the following physical properties:

| | |
|---|---|
| Shore A hardness | 78 |
| Tensile psi at 75°F. | 5900 |
| Elongation % at 75°F. | 570 |
| Tensile psi at −65°F. | 6700 |
| Elongation % at −65°F. | 350 |
| Masland Bend Test | OK at −90°F. |
| Volume Change % | 27.6 |

EXAMPLE IV

A casting was prepared from 300 parts of a polytetramethylene azelate having a reactive number of 58.7, 300 parts of tetramethylene adipate having a reactive number of 110, 158 parts of a 80%/20% mixture of 2,4- and 2,6-tolylene diisocyanate and 91 parts of 4,4'-methylene-bis-(2-chloroaniline). The cured elastomer had the following physical properties:

| | |
|---|---|
| Shore A hardness | 91 |
| Tensile psi at 75°F. | 7200 |
| Elongation % at 75°F. | 490 |
| Tensile psi at −65°F. | 5700 |
| Elongation % at −65°F. | 240 |
| Masland Bend Test | OK at −100°F. |
| Volume Change % | 22.4 |

EXAMPLE V

A casting was prepared from a liquid mixture of 300 parts of a polytetramethylene azelate having a reactive mixture of 58.7, 150 parts of a polytetramethylene adipate having a reactive number of 110, 107 parts of an 80%/20% mixture of 2,4- and 2,6-tolylene diisocyanate and 62 parts of 4,4'-methylene-bis-(2-chloroaniline). The cast and cured elastomer had the following physical properties:

| | |
|---|---|
| Shore A hardness | 87 |
| Tensile psi at 75°F. | 5700 |
| Elongation % at 75°F. | 530 |
| Tensile psi at −65°F. | 8000 |
| Elongation % at −65°F. | 340 |
| Masland Bend Test | OK at −100°F. |
| Volume Change % | 25 |

The addition of the polyadipate ester to the polyazelate ester does not impair the low temperature properties and yet results in improved fuel resistance as measured by the solvent volume change.

EXAMPLE VI

A casting was prepared from 200 parts of a polytetramethylene azelate having a reactive number of 76.2, 200 parts of a polytetramethylene adipate having a reactive number of 55.8, 85 parts of a mixture of 2,4- and 2,6-tolylene diisocyanate and 52 parts of 4,4'-methylene-bis-(2-chloroaniline). The cured elastomer had the following physical properties:

| | |
|---|---|
| Shore A hardness | 83 |
| Tensile psi at 75°F. | 5400 |
| Elongation % at 75°F. | 520 |
| Tensile psi at −65°F. | 6800 |
| Elongation % at −65°F. | 360 |
| Masland Bend Test | OK at −90°F. |
| Volume Change % | 22.5 |

EXAMPLE VII

A casting was prepared from 200 parts of a polytetramethylene azelate having a reactive number of 76.6, 200 parts of a polytetramethylene adipate having a reactive number of 111, 120 parts of a mixture of 2,4- and 2,6-tolylene diisocyanate and 77 parts of 4,4'-methylene-bis-(2-chloroaniline). The cast and cured elastomer had the following physical properties:

| | |
|---|---|
| Shore A hardness | 88 |
| Tensile psi at 75°F. | 6600 |
| Elongation % at 75°F. | 420 |
| Tensile psi at −65°F. | 7900 |
| Elongation % at −65°F. | 330 |
| Masland Bend Test | OK at −90°F. |
| Volume Change % | 18 |

Tthe percent volume change was run by ASTM method D-471-59T except the sample was allowed to stand immersed in the solvent, a mixture of 70% isooctane by weight and 30% toluene by weight, for 4 days at 75°F.

The reactive numbers of the polyester are expressed as the sum of the hydroxyl number and the carboxyl number but in general the carboxyl number will be less than 5 and preferably less than 2.

EXAMPLE VIII

A prepolymer was prepared by reacting a mixture of 400 parts of a polytetramethylene azelate having a molecular weight of 2000 and 400 parts polytetramethylene adipate having a molecular weight of 2000 with 169 parts of toluene diisocyanate. This prepolymer was stored for 28 days in an air-tight container at which time the prepolymer had a free NCO content of 4.3% while the theoretical was 4.2%.

This prepolymer was used to make sprayable polyurethane according to the recipes given in the following table:

Table 1

| Prepolymer Solution | −1 | −2 |
|---|---|---|
| Prepolymer | 200 | 200 |
| Methyl ethyl ketone | 60 | 60 |
| Cellosolve Acetate | 60 | — |
| 2-Nitropropane | | 60 |
| 10% Cellulose acetate butyrate in cellosolve acetate | 10 | 10 |
| Spray Recipe | | |
| Prepolymer Solution 1 | 100 | — |
| Prepolymer Solution 2 | — | 100 |
| Solution B* | 12.8 | 13.8 |
| Physicals on the Cured Sprayed Compositions | | |
| Spray Recipes 1 and 2 | −1 | −2 |
| Instron Tensile psi at 75°F. | 4300 | 4900 |
| Elongation % at 75°F. | 460 | 490 |
| Gauge, inches | (0.021) | (0.017) |
| Masland Bend Test | OK at −90°F. | OK at −90°F. |
| Tensile psi at −65°F. | 7100 | 7300 |
| Elongation % at −65°F. | 290 | 290 |
| Volume Change % | 21 | 20 |
| Gehman Torsion Test °C. | −21°/−40°/−44° Below −100°C. | −30°/−39°/−44° Below −100°C. |
| Crescent Tear (lbs/in) | 500 | 390 |

*Solution B was made by dissolving 172 parts of methylene bis-ortho-chloroaniline with 206 parts of methyl ethyl ketone.

EXAMPLE IX

A blend of 700 parts of a polytetramethylene adipate having a reactive number of 56 and 300 parts of a polytetramethylene azelate having a reactive number of 59 was heated to 200°–220°F. and degassed under vacuum for 45 minutes. 178 parts of toluene diisocyanate was added to the mixture of degassed polyesters. After 30 minutes reaction the vacuum was applied again. Stirring under vacuum was allowed to continue for an additional 40 minutes. The prepolymer so prepared was discharged into metal cans.

A urethane casting was prepared from 177 parts of the above prepolymer and 15 parts of molten methylene bis-orthochloroaniline. The sheets were cured at 200°F. for 22 hours. The cured elastomer was a homogeneous translucent mass.

The physical properties of the cured elastomer are given below:

| | |
|---|---|
| Shore A hardness | 85 |
| Tensile psi at 75°F. | 5150 |
| Elongation % at 75°F. | 580 |
| Tensile psi at −65°F. | 11,570 |
| Elongation % at −65°F. | 366 |
| Volume Change % | 23.8 |
| Masland Bend Test | OK at −80°F. |
| Crescent Tear (lbs/in) | 319 |
| Gehman Torsion Test °C. | −30°/−41°/−45°/−75°C. (No crystallinity) |

EXAMPLE X

A prepolymer was prepared from 350 parts of a polytetramethylene adipate having a reactive number of 111, 150 parts of a polytetramethylene azelate having a reactive number of 59 and 149 parts of a mixed tolylene diisocyanate. The prepolymer (200 parts) was heated to 160°–170°F. Then the prepolymer was treated with a mixture of 28 parts of methylene bis-ortho-chloroaniline and 7 parts of the tetramethylene azelate at 220°F. After mixing well, the liquid mixture was poured into molds. The cast specimens were treated at 203°F. for 20 hours before the translucent, homogeneous sheets were subjected to physical testing.

The results of the tests are listed below:

| | |
|---|---|
| Shore A hardness | 91 |
| Tensile psi at 75°F. | 5350 |
| Elongation % at 75°F. | 400 |
| Tensile psi at −65°F. | 8050 |
| Elongation % at −65°F. | 280 |
| Volume Change % | 17.3 |
| Masland Bend Test | OK at −70°F. |
| Crescent Tear (lbs/in) | 305 |

By the term "fast amine crosslinkers" is meant those diamines which develop a turbidity inside of about 10 to less than 25 seconds with the boiling methylene chloride test. By this method essentially a saturated solution of the diisocyanate and diamine are each made up in methylene chloride. This usually gives about 0.2 to 0.5 molar solution of the diisocyanate and the diamine when dissolved in methylene chloride. The boiling methylene chloride solutions of the diamine and the polyisocyanate are mixed and then the time required to develop a turbidity is measured. Those diamines which develop turbidity after 30 seconds are considered to be slow diamines.

When using the fast diamine it is preferred to dissolve the crosslinker in a solvent or a carrier such as a plasticizer or extender oil or materials of a similar nature. Some suitable plasticizers are tricresyl phosphate, tributoxy ethyl phosphate and dibutyl phthalate. These plasticizers can be used in amounts up to as much as about 50-60% of the polyurethane, hence the fast diamines can be used to make castings with suitable pressurized 2-component mixing equipment.

Any of the non-reactive solvents normally used in making paints which are suitable for spraying may be used in this invention. Representative examples of these are benzene, toluene, the paraffinic naphthas, the naphthenic naphthas, the aromatic naphthas, low boiling chlorinated hydrocarbons such as methylene chloride, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, cellosolve acetate, cellosolve propylate, methyl isobutyl ketone, dioxane, lower boiling nitro alkanes, etc. Mixtures of certain solvents in particular amounts may be desirable to obtain satisfactory spreading properties and evaporation rates when the polyurethane spray composition is applied to a surface. This is especially true where very volatile solvents such as benzene and acetone are used.

Also it is desirable to add to the spray composition certain pigments and other additives such as surface active agents, leveling agents, for instance, cellulose acetate butyrate, and other additives well known to the spray coating art. In particular, it is desirable to add about 0.5 to 5 parts and preferably about 1 to 2 parts of a pigment on a hundred parts of prepolymer basis to improve the weather and reflective characteristics.

Submicroscopic pyrogenic silica such as prepared in a hot gaseous environment by the vapor phase hydrolysis of silicon tetrachloride and available from Godfrey L Cabot, Inc. under the trademark CAB-O-Sil is especially useful as a leveling agent in the sprayable polyurethane compositions when used in about 0.1 to 15 parts per 100 parts of solids in the solution. The preferred amount is about 0.5 to about 6 parts as the amount of solvent needed to give a sprayable viscosity is not materially changed. Also, this range of pyrogenic silica gives good thixotropic properties to the resulting sprayable composition.

With the more soluble crosslinkers the amount of carrier or solvent used may be as low as about 5 to 25% by weight and still with suitable pressurized mixing equipment films can be formed or castings can be made. On the other hand, the very short pot life, i.e. 5 to 20 seconds and/or less soluble diamines may require from 25 to about 80% or even more of the carrier to permit the reaction mixture to be sprayed or spread as a film or coating on cloth. Hence, the amount of carrier or solvent can conveniently be varied from a low of about 5% to in excess of 80% by weight to obtain the processing properties desired. A preferred range of solvent is from about 70% based on the mixture of polyester, diamine and polyisocyanate as this range of solvents permit spray coating, spreader coating and film spreading to be accomplished. The fast diamines listed on page 3 may be used to replace the diamine in Examples VIII and the resulting fluid reaction mixture may be sprayed to form continuous films and to spread coat cloth provided the amount of carrier or solvent is adjusted and a pressurized two component spray gun or mixer is used to apply the material to the surface to be coated. In some instances the pressure may need to exceed about 1000 to 2000 pounds per square inch where the amount of solvent is less than about 50%.

Normally there is no need to cure the fluid reaction mixture containing the fast diamines at elevated temperature as ambient temperature cures are adequate but those reaction mixtures containing the slow diamines may need to be cured at elevated temperatures. Also, it has been found convenient and even advantageous in some cases to cure the reaction mixtures containing both slow and fast diamines at elevated temperatures of about 40° to 160°C. for about 1 to 30 hours.

The Masland Bend Test is run on a strip of the cured polyurethane elastomer 0.5 inches by 3 inches by 0.01 to 0.1 inch. The strip is bent back on itself to juxtaposition its ends on each other and then stapled in this position. The bent strip is mounted in a cold box and cooled to the test temperature at a rate of about 10°F. each 6 to 8 minutes. Then the sample is maintained at the test temperature, usually each 10° interval from −30°F. to the break point, for 1 hour, at which time the bent sample is subject to a quick below of 2.5 foot pounds. The temperature at which the sample breaks or shatters is taken as the Masland break point.

While certain representative embodiments and details have been shown for the purpose of illustrating the invention, it will be apparent to those skilled in this art that various changes and modifications may be made therein without departing from the spirit or scope of the invention.

What is claimed is:

1. A container having resistance to hydrocarbon materials, as measured by ASTM Method D-471-59T of less than 25 percent volume change formed of a polyurethane having an elongation in excess of 200 percent at −65°F., said polyurethane being the reaction product of a
   1. 1.25 to 2.5 mols of an organic polyisocyanate containing essentially toluene diisocyanate with
   2. 1 mol of a hydroxyl terminated polyester which comprises at least 20 weight percent of a tetramethylene azelate having a molecular weight of about 800 to 3000 and about 80 to 0 weight percent of tetramethylene adipate having a molecular weight of about 800 to about 3000, and
   3. 0.5 to about 0.9 mols of a diamine for each mol of polyisocyanate in excess of that equivalent to the hydroxyl terminated polyester.

* * * * *